United States Patent
Boehlke et al.

(10) Patent No.: US 11,356,776 B2
(45) Date of Patent: Jun. 7, 2022

(54) ONE BUTTON WIRELESS SPEAKER ASSOCIATION

(71) Applicant: Summit Wireless Technologies, Inc., Beaverton, OR (US)

(72) Inventors: Kenneth A. Boehlke, Portland, OR (US); Brian Keith Greeney, Portland, OR (US)

(73) Assignee: Summit Wireless Technologies, Inc., San Jose, CA (US)

( * ) Notice: Subject to any disclaimer, the term of this patent is extended or adjusted under 35 U.S.C. 154(b) by 58 days.

(21) Appl. No.: 16/734,245

(22) Filed: Jan. 3, 2020

(65) Prior Publication Data

US 2021/0211805 A1 Jul. 8, 2021

(51) Int. Cl.
*H04R 3/12* (2006.01)
*H04W 84/12* (2009.01)
*H04L 67/1095* (2022.01)

(52) U.S. Cl.
CPC ........... *H04R 3/12* (2013.01); *H04L 67/1095* (2013.01); *H04W 84/12* (2013.01)

(58) Field of Classification Search
CPC ........ H04N 21/44222; H04N 21/4662; H04W 76/11; H04W 48/08; H04W 8/26; H04W 64/006; G06F 3/165; G06F 3/162; H04M 1/72558
See application file for complete search history.

(56) References Cited

U.S. PATENT DOCUMENTS

| | | | |
|---|---|---|---|
| 2015/0326431 A1* | 11/2015 | Millington | H04W 12/50 709/220 |
| 2018/0139560 A1* | 5/2018 | Shi | G06F 3/048 |
| 2020/0401365 A1* | 12/2020 | Wilberding | G10L 25/51 |

* cited by examiner

*Primary Examiner* — Iqbal Zaidi
(74) *Attorney, Agent, or Firm* — Chernoff, Vilhauer, McClung & Stenzel, LLP

(57) ABSTRACT

A method of associating audio devices into a network association, including alerting a network of the presence of a first audio device by engaging a first button associated with the first audio device; assigning a first role to the first audio device; alerting the network of the presence of each subsequent audio device by engaging a subsequent button associated with each subsequent audio device; assigning a subsequent role to each subsequent audio device; and alerting the network that all subsequent audio devices have been identified by engaging the first button associated with the first audio device.

4 Claims, 5 Drawing Sheets

ONE BUTTON WIRELESS SPEAKER ASSOCIATION

Figure 1:
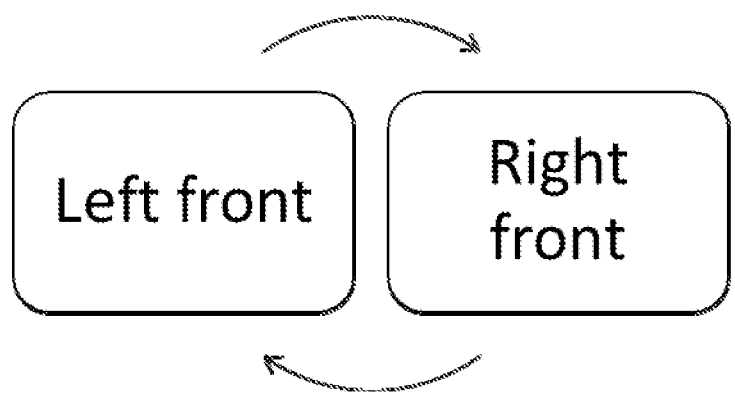

There are many methods to associate wireless devices into a network. The most common is where a Client is paired with a Wireless Access Point (WAP) by sharing an SSID and a network password. If there are multiple clients, this process is repeated for each client until all clients have joined the network.

This method is not suitable for wireless speakers because most speakers do not have a user interface and because there can be tens of speakers in a home and the resulting pairing process is very long and cumbersome. Each Client device must be paired individually with the WAP.

To simplify the process, method herein uses a single button on each device and a group process for association via the following general steps:

1. The button located on the WAP (audio source) is tapped to begin the association process.
2. The SSID and network password are randomly generated using a seed from the WAP's MAC address.
3. Using the button located on each Client (speaker), a specific sequence of devices are tapped to identify which Client (speaker) will be associated with the WAP (audio source) and which audio channel {See Table 1 for examples) is played on each speaker.
4. Each Client (speaker) will associate with the WAP (audio source), that was tapped in Step 1, and will save the SSID, network password, and audio channel information for normal operation.
5. This process is continued until all clients have joined the network.
6. The button located on the WAP (audio source) is tapped to close the association process. Alternatively, the association will close after a timeout period has passed without a button tap.
7. The audio network is available to play audio.

A button tap can be momentary press/hold of the button or multiple presses/holds of the button as needed to differentiate the button tap from other uses.

The simplest configuration to associate is the Stereo 2.0 Speaker Network. In this configuration, the first speaker tapped is the device that will become the Left Front. This device will take the dual role of the WAP/Client (audio source/speaker) and be assigned the Left Front audio channel. The second device tapped will take the role of the Client (speaker) and be assigned the Right Front audio channel.

The next configuration to associate is the Stereo 2.1 Speaker Network. In this configuration, the first speaker tapped is the device that will become the Left Front. This device will take the dual role of the WAP/Client (audio source/speaker) and be assigned the Left Front audio channel. The second device tapped will take the role of the Client (speaker) and be assigned the Right Front audio channel.

The third device tapped will take the role of the Client (speaker) and be assigned the Subwoofer audio channel.

Adding a Sound Bar brings the configuration to a 5.1 Speaker Network. In this configuration, the first speaker tapped is the device that will become the Sound Bar. This device will take the dual role of the WAP/Client (audio source/speaker) and be assigned the Left Front/Center/Right Front audio channels. The second device tapped will take the role of the Client (speaker) and be assigned the Left Surround audio channel. The third device tapped will take the role of the Client (speaker) and be assigned the Right Surround audio channel. The fourth device tapped will take the role of the Client (speaker) and be assigned the Subwoofer audio channel.

Configurations larger than a 5.1 Speaker Network are associated like a 5.1 network with the exception that the number of steps between the association of the Sound Bar and the Subwoofer grow to cover the additional speakers.

TABLE 1

Device Association Tap Sequence

| Speaker Type | Device Tap Sequence for different Speaker Configurations | | | | | |
|---|---|---|---|---|---|---|
| | 2.0 | 2.1 | 5.1(a) | 5.1(b) | 7.1(a) | 7.1(b) |
| Left Front | 1, 3[(1)] | 1, 4[(1)] | | 2 | | 2 |
| Right Front | 2 | 2 | | 5 | | 7 |
| Center | | | | 1, 7[(1)] | | 1, 9[(1)] |
| Sound Bar | | | 1, 5[(1)] | | 1, 7[(1)] | |
| Left Surround | | | | | 2 | 3 |
| Right Surround | | | | | 5 | 6 |
| Left Rear | | | 2 | 3 | 3 | 4 |
| Right Rear | | | 3 | 4 | 4 | 5 |
| Subwoofer | | 3 | 4 | 6 | 6 | 8 |

Notes:
[(1)]Repeated for association sequence termination

As shown in FIGS. 1 to 6, there may be other configurations. Other configurations not shown above can also be created by inserting or removing steps.

In addition, the order of the device sequence and the beginning and ending device may be altered.

Figure 2:
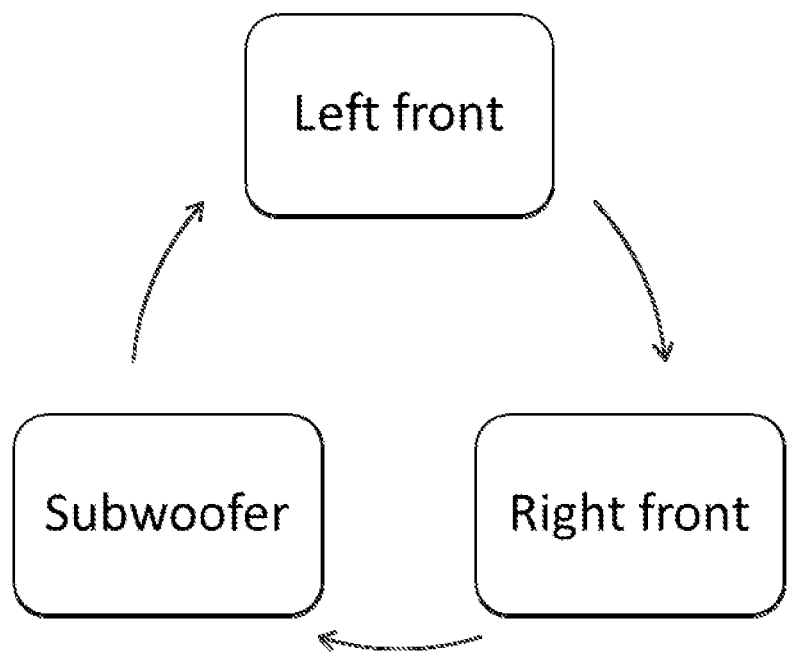
Figure 3:
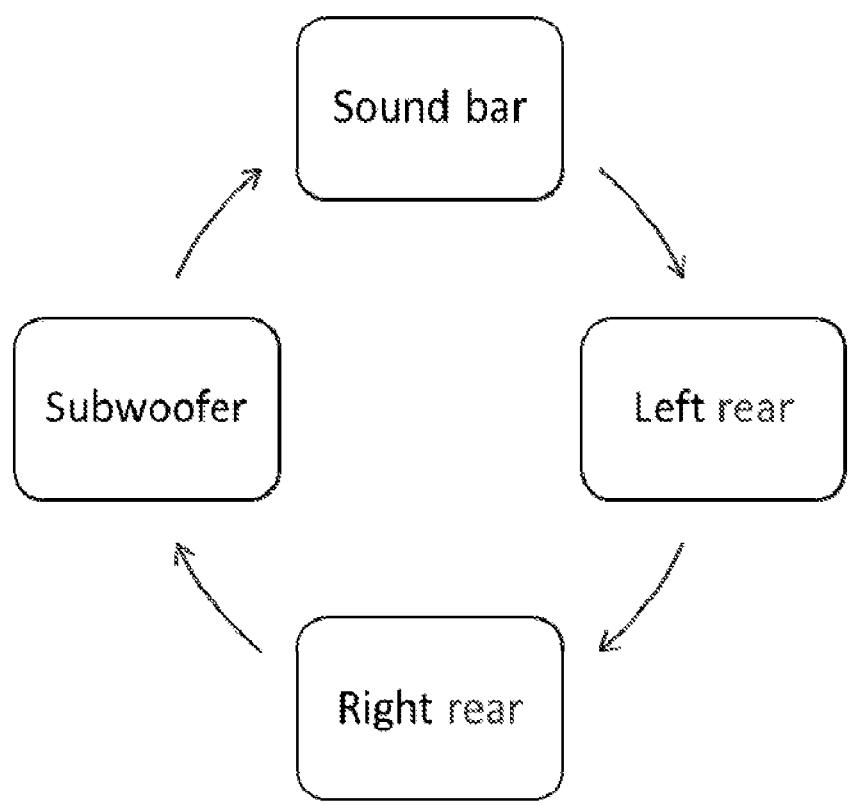
Figure 4:
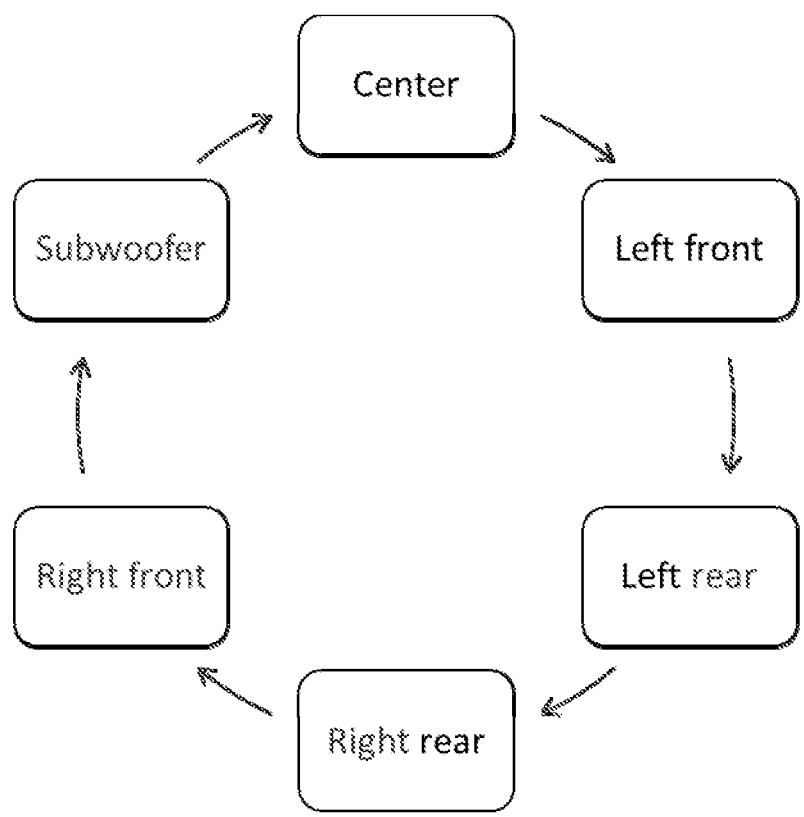
Figure 5:
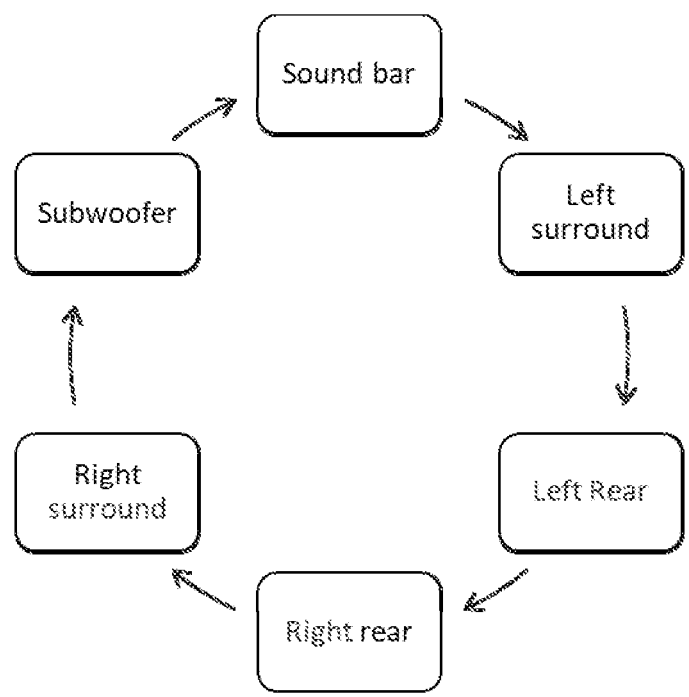
Figure 6:
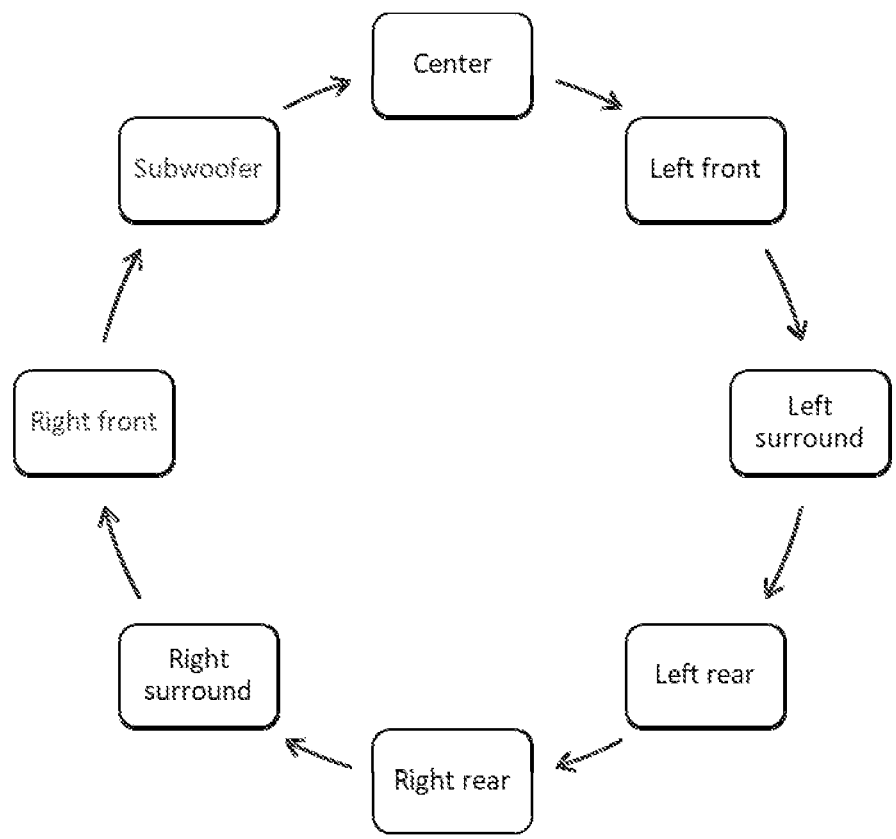

FIG. 1 shows configuration 2.0
FIG. 2 shows configuration 2.1
FIG. 3 shows configuration 5.1(a)
FIG. 4 shows configuration 5.1(b)
FIG. 5 shows configuration 7.1(a)
FIG. 6 shows configuration 7.1(b)

To aid with the user's selection of each device, voice assist or a lighted button can be used to prompt the speaker selection. Upon the first button tap the button will light or the speaker will voice prompt the user to add the second speaker. When the user taps the button at the second speaker the button will light or the speaker prompt the user to add the third speaker. This process is repeated until all devices have joined the network.

In addition to, or instead of, voice direction a chime or jingle may be played to prompt the user through the association process.

The invention claimed is:

1. A method of associating audio devices into a network association, comprising:
   a. Alerting a network of the presence of a first audio device by engaging a first button associated with the first audio device;
   b. Assigning a first role to the first audio device;
   c. Alerting the network of the presence of each subsequent audio device by engaging a subsequent button associated with each subsequent audio device;
   d. Assigning a subsequent role to each subsequent audio device;
   e. Alerting the network that all subsequent audio devices have been identified by engaging the first button associated with the first audio device; and
   f. where the first role and the subsequent roles are determinative of whether the first device and the subsequent devices are a wireless access point (WAP) or a client, and further where the first role and the subsequent roles are determinative of which audio channel(s) each device will provide or play; and g. where a network Service Set Identifier and password are generated automatically based on a media access control (MAC) address of a network Wireless Access Point.

2. A method of associating audio devices into a network association, comprising:
   a. Alerting a network of the presence of a first audio device by engaging a first button associated with the first audio device;
   b. Assigning a first role to the first audio device;
   c. Alerting the network of the presence of each subsequent audio device by engaging a subsequent button associated with each subsequent audio device;
   d. Assigning a subsequent role to each subsequent audio device;
   e. Alerting the network that all subsequent audio devices have been identified by engaging the first button associated with the first audio device; and,
   f. where the first role and the subsequent roles are determinative of whether the first device and the subsequent devices are a wireless access point (WAP) or a client, and further where the first role and the subsequent roles are determinative of which audio channel(s) each device will provide or play; and
   g. further comprising providing a prompt to a user to engage the subsequent buttons of the subsequent devices, where the prompt may be an audio prompt or may be a visual prompt or may be a combination of audio and visual prompts.

3. A 7.1(a) type audio network consisting of a plurality of audio devices, a plurality of roles, and a plurality of assignments of each of one roles to each of one audio devices, where the assignment is based on the order in which an audio device is identified to the audio network, where:
   a. A first audio device identified is assigned the role of sound bar;
   b. A second audio device identified is assigned the role of left surround;
   c. A third audio device identified is assigned the role of left rear;
   d. A fourth audio device identified is assigned the role of right rear;
   e. A fifth audio device identified is assigned the role of right surround;
   f. A sixth audio device identified is assigned the role of subwoofer;
   g. The first audio device is again identified to the network, thus indicating an absence of further audio devices in the network; and
   where a timeout is used instead of the first audio device again identified indicating an absence of further audio devices in the network.

4. A 7.1(b) audio network consisting of a plurality of audio devices, a plurality of roles, and a plurality of assignments of each of one roles to each of one audio devices, where the assignment is based on the order in which an audio device is identified to the audio network, where:
   a. A first audio device identified is assigned the role of center;
   b. A second audio device identified is assigned the role of left front;
   c. A third audio device identified is assigned the role of left center;
   d. A fourth audio device identified is assigned the role of left rear;
   e. A fifth audio device identified is assigned the role of right rear;
   f. A sixth audio device identified is assigned the role of right surround
   g. A seventh audio device identified is assigned the role of right front;
   h. A eighth audio device identified is assigned the role of subwoofer;
   i. The first audio device is again identified to the network, thus indicating an absence of further audio devices in the network; and
   where a timeout is used instead of the first audio device again identified indicating an absence of further audio devices in the network.

* * * * *

UNITED STATES PATENT AND TRADEMARK OFFICE
CERTIFICATE OF CORRECTION

| | |
|---|---|
| PATENT NO. | : 11,356,776 B2 |
| APPLICATION NO. | : 16/734245 |
| DATED | : June 7, 2022 |
| INVENTOR(S) | : Kenneth A. Boehlke and Brian Keith Greeney |

It is certified that error appears in the above-identified patent and that said Letters Patent is hereby corrected as shown below:

In the Specification

Column 2, Line 43: Replace "speaker prompt" with --speaker will prompt--

Signed and Sealed this
Second Day of April, 2024

Katherine Kelly Vidal
*Director of the United States Patent and Trademark Office*